Dec. 1, 1964  P. M. NESS  3,158,968
GRINDING APPARATUS AND METHOD
Filed Aug. 23, 1962

INVENTOR
P. M. NESS
BY David P. Kelley
ATTORNEY

United States Patent Office 3,158,968
Patented Dec. 1, 1964

3,158,968
GRINDING APPARATUS AND METHOD
Peder M. Ness, North Plainfield, N.J., assignor to Bell Telephone Laboratories, Incorporated, New York, N.Y., a corporation of New York
Filed Aug. 23, 1962, Ser. No. 218,882
8 Claims. (Cl. 51—125)

This invention relates to grinding apparatus and methods, and more particularly to apparatus and methods of forming confocal resonators for use in optical masers.

The advantages of confocal resonators for optical maser applications are disclosed in detail in an article by Boyd and Gordon in the Bell System Technical Journal, volume 40, page 489 (1961) and in a second article by Boyd and Kogelnik in the Bell System Technical Journal, volume 41, page 1347 (1962). In general, confocal cavity resonators for optical maser applications are formed by two spherical reflective surfaces having centers of curvature on a line which intersects a central portion of both surfaces. The active maser medium is disposed between the two reflectors. As it is advantageous to maximize the volume of the active material contained within the resonator cavity, it is generally desirable for the medium to fill the cavity completely. In a preferred arrangement the center axis of the resonator lies entirely within the maser medium.

In a solid state optical maser the active material is typically a rod of a crystalline material. A preferred form of the device employs reflective surfaces, as of silver, deposited directly on the preshaped ends of the crystal member. Thus, it is necessary to form convex spherical surfaces on the ends of elongated rod-like members which are of relatively small cross-section. The center of curvature of each reflective surface advantageously lies on a line which provides a long path through the active medium to the other reflective surface of the resonator. Such a line normally lies near, and is substantially parallel to the longitudinal axis of the crystal rod.

It is an object of this invention to grind and polish on the ends of elongated members of small cross-section convex spherical surfaces having centers of curvature lying near the axes of the respective members.

In a solid state optical maser using a resonator of the confocal type, the reflectors ordinarily have a radius which is several times the maximum diameter of the crystal rod. Consequently, alignment of the end surfaces must be carefully controlled during the grinding processes if the centers of curvature are to fall within acceptable limits.

A feature of the invention is a work holder with a convex spherical end surface of the desired radius of curvature and of greater area than the cross-sectional area of the member to be shaped. The end surface of the work holder has a hardness substantially the same as that of the crystal to be shaped.

Another feature of the invention is a method of grinding and polishing optical maser crystals for use as confocal resonators.

These and other objects and features of the invention will be clearly understood from the following more detailed discussion taken in conjunction with the accompanying drawing in which.

Figure 1:
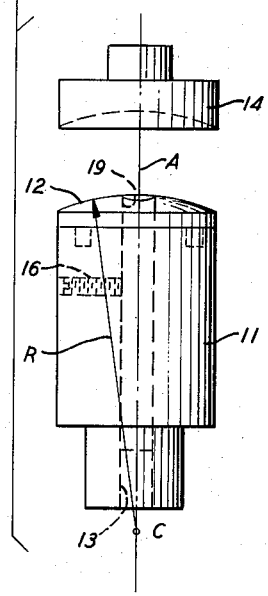
FIG. 1 depicts a work holder and lap useful in practicing the invention.

Referring now to the drawing, there is shown in FIG. 1 a work holder 11 which may comprise a cylinder of a conveniently workable metal, such as brass, or of a material having a particular hardness as disclosed hereinafter. The end suface 12 of the work holder 11 has a convex spherical shape of the same radius of curvature which it is desired to impart to the end of the optical maser crystal to be shaped. A center hole 13, extending axially of the holder 11, is adapted to receive the crystal and to hold it in position for grinding and polishing by a lap 14 which is charged with a suitable abrasive. A set screw 16 is provided to prevent the crystal from sliding about in the hole 13.

As explained above, it is desired that the spherical curved end of the crystal have its center of curvature C on a line near the longitudinal axis A of the crystal. Thus, the end surface 12 of the holder 11 is advantageously shaped so that the center of curvature C lies on the axis of the hole 13. This assures that the specified condition will be met for practically all crystals fitted into the holder.

In view of the fact that crystals desired to be shaped for optical maser use may be of varying hardnesses and, in addition, for convenience in fabricating the work holder, the end surface 12 is preferably formed as a detachable wearing face of a material having the particular hardness desired. In most cases the wearing face will be of the same material as the crystal to be finished. In the case of some optical maser media, however, samples large enough to form a solid face are scarce and it is preferred to reserve them for other uses. Smaller pieces, such as crystal fragments and small or defective crystals, may be utilized as support members 17 in the embodiment depicted in FIG. 2. In each embodiment the end face of the work holder 11 serves to stabilize the laps used in the grinding and polishing operation so that the center of curvature of the spherical surface does not deviate from the required locus. As the wearing face 12 or support members 17 are ground at substantially the same rate as the crystal, the lap advances axially and the geometrical relations among the lap, the end face and the crystal are preserved.

Figure 2:
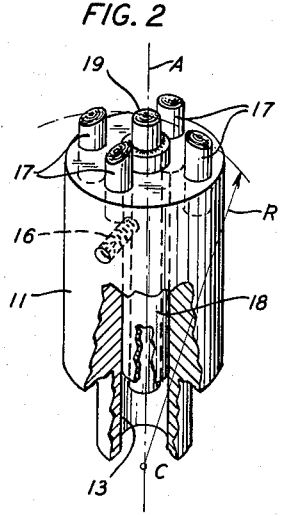
FIG. 2 depicts another embodiment of a work holder of the type illustrated in FIG. 1.

A further adaptation of the work holder illustrated in FIG. 2 is the use of a metal sleeve 18 to hold the crystal 19 in the hole 13. The sleeve 18 is better adapted to absorb the pressure of the set screw 16 than are the rather fragile crystals of some optical maser materials. Furthermore, crystals of various sizes may be fitted into the same holder merely by changing sleeves. Crystals may be advantageously held in the sleeve by means of wax or wax and rosin compounds.

Figure 3:
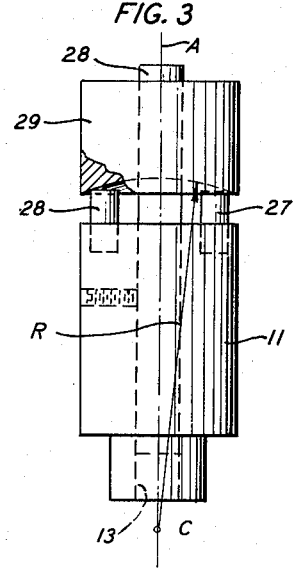
FIG. 3 is used in explaining the method of the invention.

It will be appreciated from the above discussion that the formation and maintenance of the spherical end surface of the work holder is of utmost importance in practicing the invention. In accordance with the principles of the invention the wearing surface is formed as illustrated in FIG. 3. A cylindrical guide pin 28 is secured in the hole 13 in work holder 11 with its axis near and substantially parallel to that of the hole. A first spherical lap 29, with the desired radius of curvature is rotatably mounted on the pin 28 with its center of curvature lying substantially on the axis thereof. The surfaces of the support members 27 are then conformed to the spherical surface of the lap 29 by charging it with an abrasive and rotating it about the pin 28. Finally, the lap 29 and the pin 28 are removed and the crystal to be shaped is inserted in the holder 11. A second spherical lap is then applied to the end of the crystal and to the ends of the support members to accomplish the grinding and polishing.

It is to be understood in the above discussion that a series of laps may be used with successively finer abrasive to accomplish the finishing operation. Furthermore, the invention may be adapted to grind a plurality of crystals simultaneously, provided that care is taken to insure that in the final stage of the process the extended axes of the various crystals intersect at a common point which coincides with the center of curvature of the spherical lap. Other variations and modifications of the invention are of course possible and may be made by those skilled in the art without departing from its scope and spirit.

What is claimed is:

1. The method of grinding and polishing on one end of an elongated member of small cross-section a convex spherical surface having a center of curvature lying near the axis of the member, comprising the steps of providing a work holder having an end surface of greater area than the cross-sectional area of the member to be shaped and of a hardness substantially the same as that of said member, forming in said end surface a hole adapted to receive said member with its axis substantially parallel to that of said hole, securing in said hole a circularly cylindrical guide pin extending beyond said end surface with its axis substantially parallel to that of said hole, grinding said end surface to conform to the desired spherical surface by means of a first spherical lap rotatably mounted on said guide pin with its center of curvature lying near the axis thereof, removing said guide pin and securing in its place the member to be shaped, and grinding the end of said member by means of spherical laps having the same radius of curvature as said first lap and in contact with the end surface of said holder.

2. The method of grinding and polishing on opposite ends of an elongated member of small cross-section two convex spherical surfaces having their centers of curvature on a line passing through the member substantially parallel to the axis thereof, comprising the steps of providing a holder having an end surface of greater area than the cross-sectional area of the member to be shaped and having a hardness substantially the same as that of said member, forming in said end surface a hole adapted to receive said member with its axis substantially parallel to that of said hole, securing in said hole a cylindrical guide pin extending beyond said end surface with its axis substantially parallel to that of said hole, grinding said end surface to conform to the desired spherical surface by means of a first spherical lap rotatably mounted on said guide pin with its center of curvature near the axis thereof, removing said guide pin and securing in its place the member to be shaped, grinding the ends of said member successively by means of spherical laps having the same radius of curvature as said first lap and in contact with the end surface of said holder.

3. Apparatus for grinding and polishing on an end of an elongated member of small cross-section a convex spherical surface having a center of curvature lying near the axis of the member comprising a work holder having an end surface of greater area than the cross-sectional area of the member to be shaped and having a hardness substantially equal to that of said member, said end surface having a convex spherical shape of the desired radius of curvature and said work holder having means for receiving the member to be shaped with its axis extending substantially along a radius of said surface, and means for grinding said member with spherical laps of the desired radius of curvature in contact with the end surface of said work holder.

4. Apparatus for grinding and polishing on opposite ends of an elongated member of small cross-section two convex spherical surfaces having their centers of curvature on a line passing through said member substantially parallel to the axis thereof, comprising a work holder having an end surface of greater area than the cross-sectional area of the member to be shaped and having a hardness substantially equal to that of said member, said end surface having a convex spherical shape of the desired radius of curvature and said work holder having means for receiving reversibly the member to be shaped with its axis extending substantially along a radius of said surface, and means for grinding the ends of said member in succession with spherical laps of the desired radius of curvature in contact with the end surface of said work holder.

5. Apparatus for grinding and polishing on an end of an elongated member of small cross-section a convex spherical surface having a center of curvature lying near the axis of the member comprising a work holder having an end surface of greater area than the cross-sectional area of the member to be shaped and having a hardness substantially equal to that of said member, said end surface having a convex spherical shape of the desired radius of curvature and said work holder having means for receiving seriatum a guide pin and the member to be shaped with its axis extending substantially along a radius of said surface, and means for grinding said member with spherical laps of the desired radius of curvature in contact with the end surface of said work holder.

6. Apparatus for grinding and polishing on opposite ends of an elongated member of small cross-section two convex spherical surfaces having their centers of curvature on a line passing through said member substantially parallel to the axis thereof, comprising a work holder having an end surface of greater area than the cross-sectional area of the member to be shaped and having a hardness substantially equal to that of said member, said end surface having a convex spherical shape of the desired radius of curvature and said work holder having means for receiving seriatum a guide pin and a reversible member to be shaped with its axis extending substantially along a radius of said surface, and means for grinding the ends of said member in succession with spherical laps of the desired radius of curvature in contact with the end surface of said work holder.

7. The method of grinding and polishing on one end of an elongated member of small cross-section a convex spherical surface having a center of curvature lying near the axis of the member, comprising the steps of providing a work holder having an end surface of greater area than the cross-sectional area of the member to be shaped and of a hardness substantially the same as that of said member, forming in said end surface a hole adapted to receive said member with its axis substantially parallel to that of said hole, shaping said end surface to conform to a spherical surface of the desired radius of curvature with its center of curvature lying near the axis of said hole, securing in said hole the member to be shaped, and grinding the end of said member by means of spherical laps having the same radius of curvature as said end surface and in contact therewith.

8. The method of grinding and polishing on opposite ends of an elongated member of small cross-section two convex spherical surfaces having their centers of curvature on a line passing through the member substantially parallel to the axis thereof, comprising the steps of
providing a holder having an end surface of greater area than the cross-sectional area of the member to be shaped and having a hardness substantially the same as that of said member,
forming in said end surface a hole adapted to receive said member with its axis substantially parallel to that of said hole,
shaping said end surface to conform to a spherical surface of the desired radius of curvature with its center of curvature near the axis of said hole,
securing in said hole the member to be shaped,
grinding the ends of said member successively by means of spherical laps having the same radius of curvature as said end surface and in contact therewith.

References Cited in the file of this patent

UNITED STATES PATENTS

| | | |
|---|---|---|
| 949,760 | Flad | Feb. 22, 1910 |
| 1,467,308 | Clement et al. | Sept. 11, 1923 |
| 1,849,452 | Fuchs | Mar. 15, 1932 |
| 2,129,522 | Burroughs | Sept. 6, 1938 |
| 2,151,233 | Rowe | Mar. 21, 1939 |
| 2,420,606 | McLeod et al. | May 13, 1947 |
| 2,434,614 | Hicks | Jan. 13, 1948 |
| 2,736,993 | Tripp | Mar. 6, 1956 |
| 2,745,227 | Pilger | May 15, 1956 |
| 2,922,264 | Mushrush | Jan. 26, 1960 |
| 3,032,936 | Voice | May 8, 1962 |